3,187,683
CARGO HANDLING APPARATUS
Robert C. Schroeder, 5 Raymond Court, Dearborn, Mich., and David D. Wood, 9000 Warren Road, Plymouth, Mich.
Filed Aug. 20, 1962, Ser. No. 217,867
11 Claims. (Cl. 104—135)

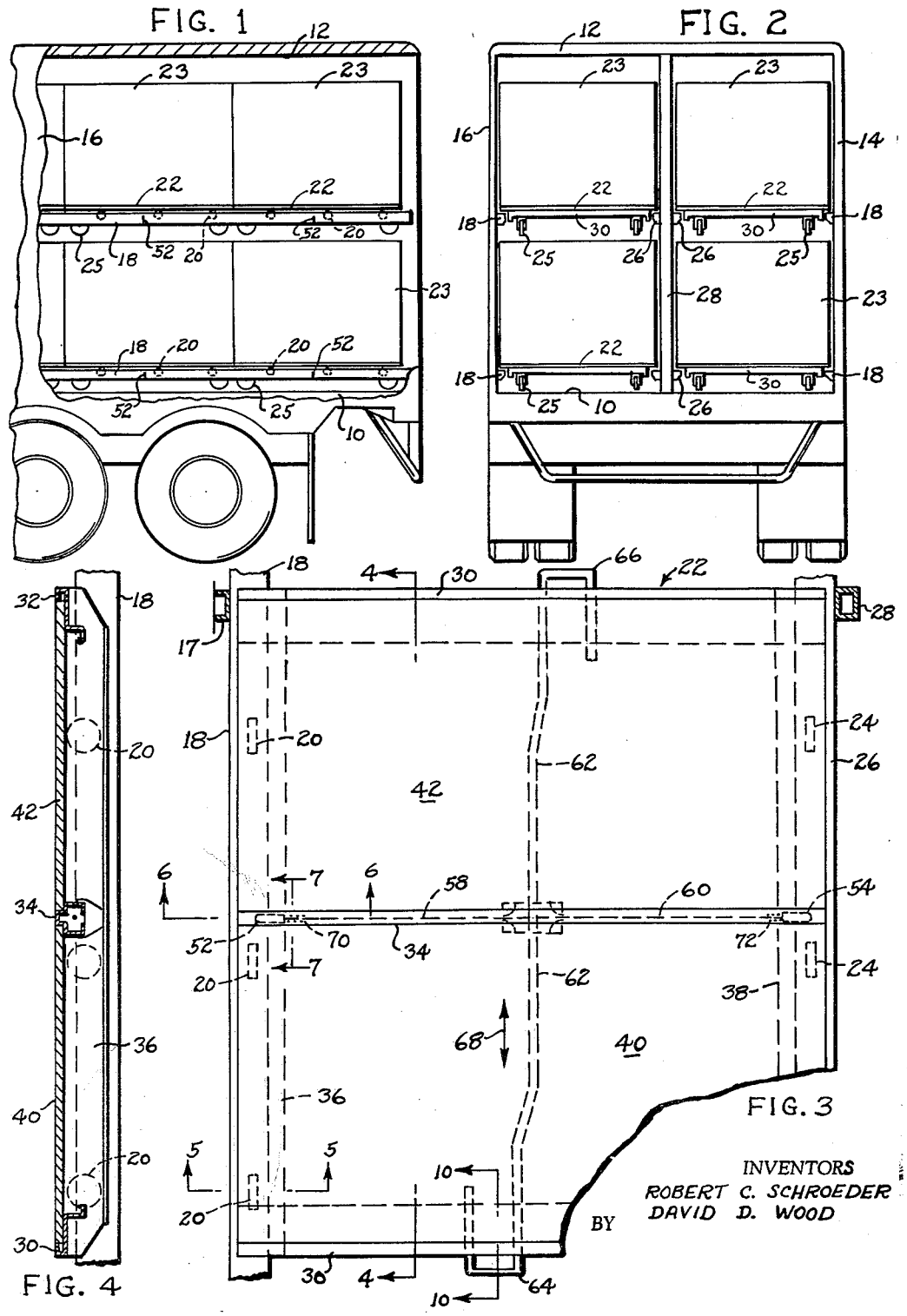

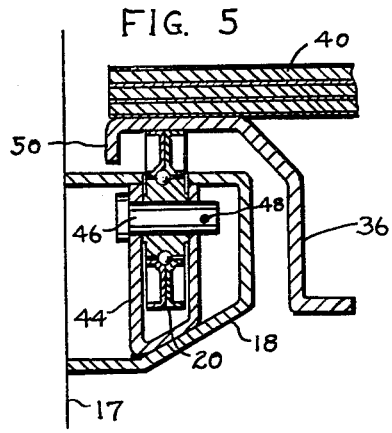
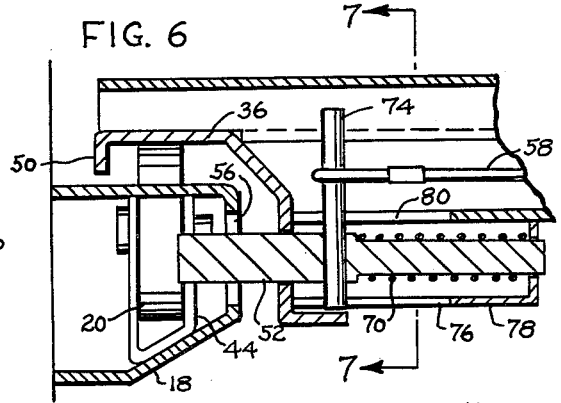
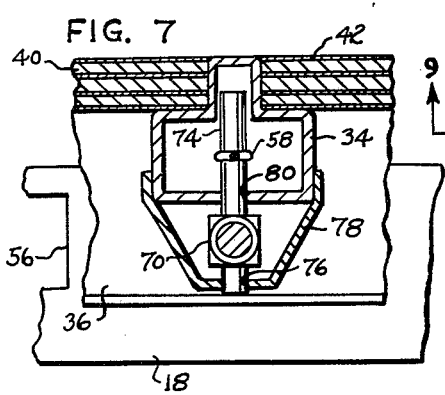
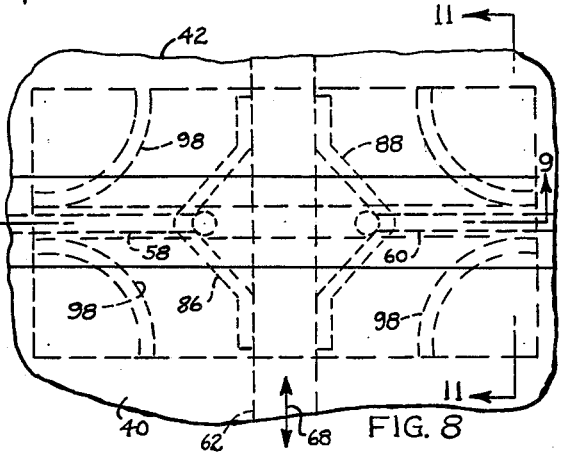
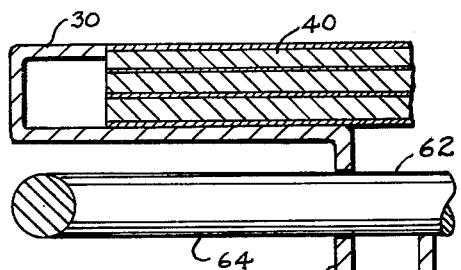
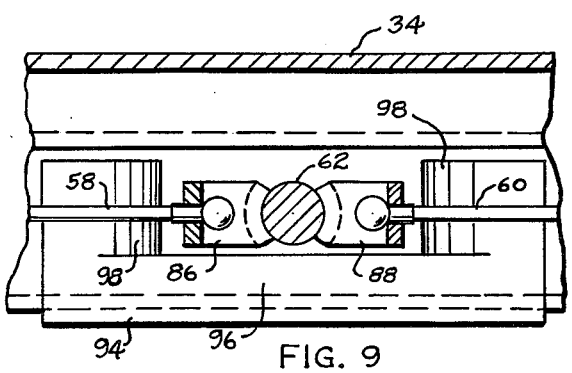
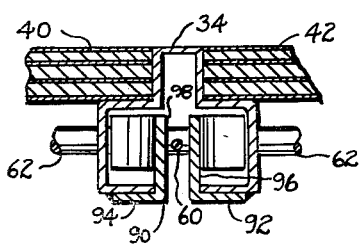
INVENTORS
ROBERT C. SCHROEDER
DAVID D. WOOD

United States Patent Office 3,187,683
Patented June 8, 1965

This invention relates to cargo vans or the like, and particularly to mechanisms for simplifying the cargo loading-unloading operations therein. In one of its forms the invention is embodied in a novel shuttle or rollerway arrangement which enables special cargo carriers to be easily and quickly transferred longitudinally back-and-forth in vans or other storage areas.

Conventionally it is the practice in loading cargo into vans to pack the cargo on pallets or in large open topped boxes, and to then stack the boxes or pallets against one another in the van. Such stacking procedures usually are performed by lift truck and involve much back-and-forth movement of the lift truck in the van, with considerable expenditure of time, poor utilization of van space, and excessive wear on the van floor and wall surfaces.

One object of the present invention is to provide a van loading-unloading arrangement which eliminates the above difficulties.

Another object is to provide a van loading-unloading arrangement wherein the cargo is adequately prevented from shifting in the van during transit.

More particularly, it is an object of the invention to provide a conventional cargo van or similar storage area with a series of longitudinally extending guideways and a plurality of specially designed cargo carriers, each carrier being constructed so that it can be easily shuttled back-and-forth along the guideways for the full van length, thus eliminating the necessity for having lift trucks or the like move in and out of the van during cargo loading and unloading operations.

A further object is to provide a cargo carrier shuttle mechanism which can be built at a reasonable cost, and which requires little maintenance or need for replacement after installation.

An additional object is to provide a cargo carrier shuttle mechanism wherein each carrier is normally retained in a fixed latched position, but wherein each carrier can be unlatched by a longitudinal pushing or pulling motion in the shuttling direction, the arrangement enabling each carrier to be unlatched and then slid bodily by a single continuous effort of the workman.

A still further object is to provide a cargo carrier construction having a latch which is automatically operated by the natural movement of a lift truck so that the carrier may be shuttled about and locked in place in one continuous lift truck movement.

As an alternative to the above, a further object is to provide a cargo carrier shuttle arrangement wherein the carriers are adapted to have cooperating coupling elements on their engaged ends such that a string of carriers may be locked together and moved as a unit, either into or out of the storage area.

Other objects of this invention will appear from the following description and appended claims, reference being had to the accompanying drawings forming a part of this specification wherein like reference characters designate corresponding parts in the several views.

In the drawings:
FIGURE 1 is a side elevational view of a highway van, with parts thereof broken away to illustrate the use of a cargo carrier shuttle mechanism of our invention therein;
FIG. 2 is a rear elevational view of the FIG. 1 van;
FIG. 3 is an enlarged plan view of a cargo carrier forming part of the FIG. 1 shuttle mechanism;
FIG. 4 is a sectional view taken on line 4—4 in FIG. 3;
FIG. 5 is an enlarged sectional view taken on line 5—5 in FIG. 3;
FIG. 6 is an enlarged sectional view on line 6—6 in FIG. 3;
FIG. 7 is a fragmentary view on line 7—7 in FIG. 6;
FIG. 8 is an enlarged view of a portion of the structure shown in FIG. 3;
FIG. 9 is a sectional view on line 9—9 in FIG. 8;
FIG. 10 is an enlarged view taken on line 10—10 in FIG. 3, but with the parts in different relative positions; and
FIG. 11 is a reduced scale sectional view taken on line 11—11 in FIG. 8.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, particularly FIGS. 1 and 2, there is shown a highway cargo van comprising a floor 10, roof 12, and side walls 14 and 16. The rear of the van may be closed by conventional means such as a tailgate, curtain, or a pair of swingable doors; however to simplify the illustration these are not shown herein. The detailed construction of each van side wall is also not shown but it will be understood that each wall may comprise a series of upright pillars, horizontal frame members, and exterior sheathing, as is conventional.

Under the present invention the van side wall pillars 17 carry one or more rails 18, the cross section of which is shown in FIGS. 5 and 6. Mounted at longitudinally spaced points along each rail 18 are fixed axis rollers 20, the peripheral edges of which form guideway surfaces for slidably supporting the outer longitudinal edges of panel-like cargo carriers 22.

As shown in FIGS. 1 and 2, each carrier 22 supports an open-topped box 23, which may be used to retain any of several types of cargo, as for example grocery items, department store packages, mail bags, or industrial packaged items such as liquid valves, electric switches, etc. The use of open-topped boxes 23 for retaining the freight is believed to be applicable to many customer situations and user facilities, but it is recognized that the cargo could be strapped directly on the carriers 22, in which case the carriers would function as pallets in the conventional manner.

Whatever the manner of supporting the cargo on carriers 22, a main feature of our invention relates to the ability of the carriers to be individually or in groups slid back-and-forth longitudinally in the van on the fixed axis rollers 20 (and companion rollers to be described hereinafter). By this feature the process of loading and unloading the cargo is greatly simplified in that the lift truck or other transfer means need only deliver cargo to or take cargo from the extreme rear end of the van; i.e., there is no need for the lift truck to move into the van interior where it is difficult for the truck to maneuver or to gain access to the cargo items.

The carriers 22 may if desired be equipped with ground-engaging caster wheels 25 as shown in FIGS. 1 and 2. As thus equipped, the carriers may be manually shifted about in the warehouse or storage area without need for a lift truck motive force. However, when the carriers are in the van it is preferred that they be supported on the aforementioned fixed axis rollers 20 with the caster wheels raised from the van floor surface as shown in FIG. 2, this for the reason that the van floor surface is relatively rough and uneven, and would not in many instances permit desired cooperation between certain latch and keeper mechanisms utilized to hold the carriers in place during van transit periods.

Referring now to FIGS. 2 and 3, the inner longitudinal edges of carriers 22 are shown slidably supported on fixed axis rollers 24 which are mounted on rails 26. As shown in FIG. 2, rails 26 are suitably carried on posts or pillars 28 which extend from the floor to the roof of the van. These posts or pillars may be fixedly mounted in the van or they may be removably mounted therein, as for example in the manner shown generally in FIGS. 14 and 15 of our copending patent application, Serial No. 811,988, filed May 8, 1959. Long items such as caskets might in some cases be disposed in transverse directions extending across the width of the van, in which case the center posts would not be used.

Rails 18 and 26 may be constructed in relatively short sections corresponding in length to the spacing between respective ones of the pillars 17 and 28, in which event they may be removably mounted on the pillars, as by latch-detent means of the type shown generally in FIGS. 4, 7, 8 and 9 of the aforementioned patent application, Serial No. 811,988. The individual rails may be of any convenient length, but for handling and installation purposes a length not in excess of about eight feet is preferred. The individual pillars 17 and 28 are preferably spaced apart according to the rail length so that each rail is disposed with its ends supported on a pillar. The cargo carriers are each built to a conveniently handled length, as for example four feet. As indicated, the pillars and rails can be removably or fixedly mounted in the van.

In general, removable mounting of pillars 28 and rails 18 and 26 is advantageous in that it permits the van to be equipped with varying rail arrangements and rail spacings, using a minimum number of individual rails, all in accordance with the nature of the cargo being shipped during a given trip. Fixed mounting of pillars 28 and rails 18 and 26 is advantageous in that it adds rigidity to the van and avoids the cost of the latch-detent means; by building the rails 18 into the van during its manufacture the total cost of the van-shuttle combination may actually be comparable to the cost of a conventional van.

Referring again to FIGS. 3 and 4, each carrier 22 will be seen to comprise a front transverse bar 30, a rear transverse bar 32, and an intermediate transverse bar 34. The corresponding ends of these bars are connected by two identical longitudinal side bars 36 and 38, the cross sections of which are shown in FIG. 5. The terms "front" and "rear" are applicable to the illustrated carrier only in its relation to the van, since bars 30 and 32 are identical, and the carrier is reversible end-for-end, i.e., the front and rear halves of the carrier are mirror images so that either end of the carrier may constitute the front or leading end without affecting performance. This feature is of some importance to the workman in that it enables him to load cargo without having to remind himself that he must deliver the carrier to the guideways with a particular end facing frontwards.

As shown in FIG. 4, the space between bars 30 and 34 is occupied by a plywood panel 40, and the space between bars 34 and 32 is occupied by a plywood panel 42. The two panels extend in the general plane of the transverse bars with their longitudinal edge areas resting on the upper surfaces of bars 36 and 38 in the manner best shown in FIG. 5. Suitable bolts or rivets (not shown) are extended through the bars and panels to provide a rigid bar-panel assembly, although adhesives or other fastening means might be employed for this purpose.

Previously mention was made in a general way of the fixed axis rollers 20 and 24. The preferred construction and mounting of these rollers is shown in FIG. 5 where it will be seen that each roller 20 is positioned within a generally U-shaped bracket 44 suitably welded or otherwise secured to rail 18. Each roller is provided with an axle 46 which extends through the bracket legs and is secured by a cotter pin 48.

Each of the side bars 36 and 38 is preferably provided with a downturned flange 50 which is arranged to be alongside rollers 20 to prevent undesired lateral motion of the carrier 22 as it is moved along the guideways defined by the rollers 20 and 24. The spacing between flanges 50 is preferably somewhat greater than the spacing between rollers 20 and 24 to compensate for cumulative manufacturing tolerances in the van and carrier, and to permit the carrier to be easily deposited from the forks of a lift truck onto the rollers without precise alignment of the truck fork relative to the lateral dimensions of the van. The spacing between flanges 50 is however not made sufficiently great as would permit members 36 and 38 to rub against rails 18 and 26. The space immediately above each set of rollers is structure-free so that a lift truck may freely deposit the carriers 22 onto the rollers or remove the carriers therefrom. It would be possible to reverse the positions of the rollers and flanges 50, although the illustrated arrangement is preferred.

Preferably each carrier is individually locked to rails 18 and 26 during van transit periods. For this purpose each carrier is provided with two laterally projecting latch bolts 52 and 54 (FIG. 3) which are arranged as illustratively shown in FIG. 6 to enter into keeper openings 56 (FIG. 6) in rails 18 and 26. As shown schematically in FIG. 3, each latch bolt is connected with a cable 58 or 60 which extends laterally to connection with a longitudinally extending push-pull operator 62. The opposite end portions 64 and 66 of operator 62 are U-shaped as shown in FIG. 3 so as to constitute manual handles for pushing or pulling the operator in the directions denoted by arrow 68. Springs 70 and 72 normally act to force latch bolts 52 and 54 outwardly to their rail-engaged positions in which handles 64 and 66 each project beyond the limits of the carrier as shown in FIG. 3.

In operation of the FIG. 3 latch arrangement the spring-urged latch bolts 52 and 54 may be withdrawn from rail openings 56 by either a pushing or pulling motion on whichever handle (64 or 66) is at a given moment accessible to the workman. Since this pushing or pulling motion is in the same direction as that required to move carrier 22 along the fixed guideways it follows that the act of unlatching the latches and moving the carrier may be performed quickly and easily in one single continuous movement, manually or by lift truck. When the manual hold on handle 64 or 66 is released the latch bolts 52 and 54 automatically snap into the registering openings 56 in the fixed rails. Adjacent ones of these openings may be spaced different distances from one another as deemed necessary. For example, a one inch spacing between openings is suitable in most cases to compensate for usual manufacturing tolerances and freight bracing clearances. From a theoretical standpoint it would only be necessary to provide one set of opposed openings 56 for each carrier 22, but from a practical standpoint it is preferred to provide additional openings to insure the availability of openings in all situations, as for example when carriers of different lengths are utilized in a single van.

For a better understanding of the latch means reference is made to FIGS. 6 through 11. Thus, referring to FIG. 6, cable 58 is shown connected to a vertical pin 74 which is affixed to latch bolt 52. The lower end portion of pin 74 extends within a slot 76 in bracket 78, and an intermediate portion of the pin extends within a slot 80 formed in bar 34. The bracket and bar are secured together, as by welding, so as to constitute a unitary structure for guiding pin 74 in its movement toward and away from the adjacent rail 18. The pin is secured to bolt 52, and the bolt is suitably guided in spaced openings in bar 36 and bracket 78. Thus, the assembly of the latch bolt and pin 74 is mounted for slidable jam-free movement within its mounting structure.

Various bracket configurations and bolt-cable connections could be employed in practice of the invention, but preferably the arrangement is such as to dispose the latch bolt and cable within the confines of the carrier 22 so as to be shielded from damage due to the rough handling which is an inevitable part of freight-moving operations. In the illustrated arrangement the cable extends within hollow bar 34, and the spring-engaged portion of bolt 52 extends within bracket 78. Only the operating tip of the bolt projects from the carrier. FIGS. 6 and 7 show the mounting arrangement for bolt 52 but it will be understood that a similar mounting arrangement is provided for bolt 54.

Referring now to FIGS. 8, 9 and 11, there is shown in greater detail the structure appearing in the central portion of FIG. 3. As shown in FIG. 8 operator rod 62 carries two V-shaped brackets 86 and 88 which serve as anchorage for the inner ends of the two cables 58 and 60. The cables extend through the spaces between two guide plate structures generally identified by numerals 90 and 92. Each guide plate structure comprises a horizontal lower plate portion 94 and an upstanding plate portion 96. As best shown in FIGS. 8 and 9 the central areas of portion 94 are turned arcuately to define curved guide or cam surfaces 98. Each guide plate structure is secured to bar 34, as by welding at 100.

In operation, when rod 62 is manually moved in the arrow 68 direction the anchorage points for the cables are shifted away from the axis of bar 34; the cables are constrained by guide surfaces 98 so that portions thereof are drawn toward the rod 62 axis. As a result the latch bolts 52 and 54 are withdrawn from rail openings 56 (FIG. 6). When the manual force on operator handles 64 or 66 (FIG. 3) is released the springs 70 and 72 draw the cables and operator rod back to their normal positions.

As best seen in FIGS. 3 and 10, each handle (64 or 66) comprises a U-shaped structure which extends through guide openings in the carrier bar 30 or 32. The central portion of the operator rod extends through bar 34 so that the rod is guided at three longitudinally spaced points.

In general review, the device as shown in FIGS. 1 and 2 comprises anti-friction guide structures 20 and 24 disposed along the van side walls and in the central space therebetween. These guide structures are adapted to slidably receive and support the cargo carriers 22, each of which comprises a metal framework and plywood paneling. Each carrier is provided with two normally extended latch bolts 52 and 54 which may be withdrawn from fixed keeper openings 56 by means of a longitudinally movable operator rod 62. Preferably the latch means is at least semi-shielded from damage or jamming by disposing same within parts of the carrier.

In operation each carrier may be unlatched and moved along the anti-friction guide structures by a pushing or pulling motion on whichever handle 64 or 66 is most convenient at the moment. The handles are offset as shown in FIG. 3 so that when two carriers abut against one another there is no striking of one handle against another such as would disengage a latch from its keeper opening 52. As previously indicated the number of carriers 22 may be varied to suit the size of the van. Thus, a twenty-five foot van could accommodate six carriers (of four feet unit length) on each guideway structure. With four guideway structures as shown in FIG. 2 a total of twenty-four carriers could be accommodated. With additional guideway structures at various other levels than shown in FIG. 2 additional cargo carriers could be accommodated. As previously stressed, a major feature of the invention is the reduction in cargo loading and unloading times achieved by the process of sliding the carriers back-and-forth in the van.

Some features of the arrangement can be modified or eliminated. For example, within the broader aspects of the invention the latch structures formed by members 62 and 52 could be eliminated in favor of other latching arrangements. Additionally, the mating ends of the carriers could be provided with releasable coupling elements to facilitate movement of the carriers as a train-like unit.

It will be understood that the invention can be practiced while using other structures constituting modifications of the illustrated arrangement, all as coming within the scope of the appended claims.

We claim:

1. In a cargo storage area having an elongated cargo space defined in part by two side structures: the improvement comprising guideways extending longitudinally within the cargo space along the side structures; a series of cargo carriers adapted to be slidably supported in end-to-end relation on said guideways for longitudinal movement therealong; each carrier having a retractable latch, and at least one of the side walls having a cooperating keeper; each latch being provided with an operator which extends longitudinally of the carrier; each operator having opposite end portions which normally project beyond the front and rear limits of the carrier so that a longitudinal actuating force on either end portion is effective to operate the latch; the opposite end portions of each operator being laterally offset on opposite sides of a longitudinal line taken through the carrier so that adjacent end portions of the operators on different carriers are prevented from striking one another.

2. In combination, a cargo storage area defined in part by two parallel longitudinally extending guideways located in a horizontal plane; a series of cargo carriers adapted to be slidably supported in end-to-end relation on said guideways for longitudinal movement therealong; a keeper associated with at least one of the guideways; a retractable latch bolt mounted on each carrier for releasable engagement with the keeper; spring means operable to normally advance the bolt toward the keeper; retracting means for each latch bolt comprising a first push-pull operator portion located adjacent one end of the carrier, and a second push-pull operator portion located adjacent the other end of the carrier, whereby the latch bolt can be retracted by a pushing or pulling motion from either end of the carrier.

3. In combination, a cargo storage area defined by two parallel longitudinally extending guideways located in a horizontal plane; a series of cargo carriers adapted to be slidably supported in end-to-end relation on said guideways for longitudinal movement therealong; each carrier comprising a front transverse bar, a rear transverse bar, an intermediate transverse bar, side rails interconnecting said bars, a first panel supported between the front and intermediate bars, and a second panel supported between the intermediate and rear bars; said front and rear bars having portions defining shock resistant edge areas for preventing contact between panels on adjacent carriers when said adjacent carriers abut against one another.

4. In combination, a cargo storage area defined in part by two parallel longitudinally extending guideways located in a horizontal plane; a series of cargo carriers adapted to be slidably supported in end-to-end relation on said guideways for longitudinal movement therealong; each carrier comprisig a front transverse bar, a rear transverse bar, an intermediate transverse bar, side rails interconnecting said bars, a first panel supported between the front and intermediate bars, and a second panel supported between the intermediate and rear bars; at least one keeper associated with one of the guideways; a retractable latch mounted on the carrier adjacent one extremity of the intermediate bar; spring means operable to normally advance the latch toward the keeper; and latch retracting means including a transversely movable operator portion extending within the intermediate bar.

5. In combination, a cargo storage area defined in part by two parallel longitudinally extending guideways located in a horizontal plane; a series of cargo carriers adapted to be slidably supported in end-to-end relation on said guideways for longitudinal movement therealong; each of said guideways comprising a horizontal rail having a series of keeper openings formed at spaced points therealong; each carrier comprising a front transverse bar, a rear transverse bar, an intermediate transverse bar, side rails interconnecting said bars, a first panel supported between the front and intermediate bars, and a second panel supported between the intermediate and rear bars, two transversely movable spring-urged latch elements slidably disposed on the carrier adjacent opposite extremities of the intermediate bar for entering into selected keeper openings to normally lock the carrier against movement; a rigid latch operator element mounted on the carrier for longitudinal movement parallel with the side rails; and a flexible connector element extending between the operator element and each latch bolt, whereby longitudinal movement of the operator element provides transverse slidable movement of each latch element.

6. In combination, a cargo storage area defined in part by two parallel longitudinally extending guideways located in a horizontal plane; a series of cargo carriers adapted to be slidably supported in end-to-end relation on said guideways for longitudinal movement therealong; each of said guideways comprising a horizontal rail having a series of keeper openings formed at spaced points therealong; each carrier comprising a front transverse bar, a rear transverse bar, an intermediate transverse bar, side rails interconnecting said bars, a first panel supported between the front and intermediate bars, and a second panel supported between the intermediate and rear bars, two transversely movable spring-urged latch elements slidably disposed on the carrier adjacent opposite extremities of the intermediate bar for entering into selected keeper openings to normally lock the carrier against movement; a rigid latch operator element mounted on the carrier for longitudinal movement parallel with the side rails; a flexible connector element extending within the intermediate bar between the operator element and each latch bolt; and cams within the intermediate bar and adjacent the latch operator for constraining the connector elements, whereby longitudinal movement of the operator element provides transverse slidable movement of each latch element.

7. In combination, a cargo storage area defined in part by two parallel longitudinally extending guideways located in a horizontal plane; a series of cargo carriers adapted to be slidably supported in end-to-end relation on said guideways for longitudinal movement therealong; a retractable latch disposed on each carrier; keepers associated with at least one of the guideways at spaced points therealong for retention of the latches to normally maintain the carriers against longitudinal movement; and an operator for each latch comprising an actuator portion located at each end of the respective carrier.

8. In combination, a cargo storage area defined in part by two parallel longitudinally extending guideways located in a horizontal plane; a series of cargo carriers adapted to be slidably supported in end-to-end relation on said guideways for longitudinal movement therealong; a keeper associated with at least one of the guideways; a retractable latch carried on each carrier for engagement with the keeper to normally retain the carrier against movement; and latch operator means having actuator portions disposed adjacent each end of the carrier so that each latch can be actuated with opposite ends of its carrier transposed.

9. In combination, a cargo storage area defined in part by two parallel longitudinally extending guideways; a series of cargo carriers adapted to be slidably supported in end-to-end relation on said guideways for longitudinal movement therealong; a retractable latch element movably supported on at least one of the carriers; keeper means associated with one of the guideways for retentive engagement with the latch element to normally prevent movement of the carrier; spring means urging the latch element to its position of engagement with the keeper means; and a push-pull operator for the latch being drawn by the spring means to an intermediate position, and being operable by a pushing force thereon to assume a second position in which the latch element is retracted, and being operable by a pulling force thereon to assume a third position in which the latch element is retracted.

10. In combination, a cargo storage area defined in part by two horizontal parallel guideways; each guideway comprising a hollow elongated rail and a series of widely spaced anti-friction elements carried at longitudinally spaced points thereon; said anti-friction elements comprising horizontal axis rollers disposed within the hollow spaces defined by the rails; said rollers having their upper peripheral surfaces projecting upwardly above the rails, and the spaces immediately above said rollers being unobstructed whereby to permit cargo carriers to be deposited on and removed from the rollers by vertical movements; the combination further comprising a series of cargo carriers adapted to be slidably supported in end-to-end relation on the anti-friction elements for movement parallel with the rails; each of said rails including a side wall spaced inwardly of the associated rollers in the direction of the cargo storage area; a retractable latch disposed on at least one of the carriers in a location registering with the side wall of one rail; a series of openings formed in said last mentioned side wall at longitudinally spaced points therealong, whereby to selectively constitute keepers for the latch; and an operator for the latch carried on said one cargo carrier.

11. In a cargo storage area having an elongated cargo space defined in part by two side structures: the improvement comprising guideways extending longitudinally within the cargo space along the side structures; a series of cargo carriers adapted to be slidably supported in end-to-end relation on said guideways for longitudinal movement therealong; each carrier having a retractable latch, and at least one of the side walls having a cooperating keeper each latch being provided with an operator which extends longitudinally of the carrier; each operator having opposite end portions arranged so that a longitudinal actuating force on either end portion is effective to operate the latch; the opposite end portions of each operator being laterally offset on opposite sides of a longitudinal line taken through the carrier so that adjacent end portions of the operators on different carriers are prevented from striking one another.

References Cited by the Examiner
UNITED STATES PATENTS

| | | | |
|---|---|---|---|
| 922,293 | 5/09 | Kirchner | 220—1.5 |
| 1,094,962 | 4/14 | Arens | 105—366 |
| 1,189,430 | 7/16 | Diou | 214—38 |
| 1,589,687 | 6/26 | Greene | 296—24 X |
| 2,711,835 | 6/55 | Kappen | 214—38.20 |
| 2,898,872 | 8/59 | Hastings | 214—38.46 X |
| 2,978,994 | 4/61 | Miller | 105—376 |
| 3,014,604 | 12/61 | Loomis | 214—38 |

MILTON BUCHLER, *Primary Examiner.*

A. HARRY LEVY, *Examiner.*